(12) United States Patent
Staudenrausch

(10) Patent No.: US 8,678,885 B2
(45) Date of Patent: Mar. 25, 2014

(54) VACUUM CONTROL IN A VACUUM FILLER WITHOUT EXTERNAL AIR SUPPLY

(75) Inventor: Martin Staudenrausch, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 77 days.

(21) Appl. No.: 13/474,753

(22) Filed: May 18, 2012

(65) Prior Publication Data
US 2012/0295526 A1   Nov. 22, 2012

(30) Foreign Application Priority Data
May 20, 2011 (EP) ..................................... 11166888

(51) Int. Cl.
*A22C 11/00* (2006.01)
(52) U.S. Cl.
USPC .......................................................... 452/31
(58) Field of Classification Search
USPC ........... 452/40, 41, 30–32, 35–37, 46–48, 51; 418/15, 24, 31, 71, 127, 128, 255, 257, 418/258, 260
See application file for complete search history.

(56) References Cited

U.S. PATENT DOCUMENTS

| | | | | |
|---|---|---|---|---|
| 3,612,733 A | * | 10/1971 | Wilcox | 418/16 |
| 3,658,446 A | * | 4/1972 | Jansson | 418/31 |
| 5,102,314 A | * | 4/1992 | Staudenrausch | 418/15 |
| 5,380,240 A | * | 1/1995 | Staudenrausch | 452/41 |
| 6,110,033 A | * | 8/2000 | Frey | 452/40 |
| 6,309,293 B1 | * | 10/2001 | Zinser | 452/41 |
| 7,500,909 B2 | * | 3/2009 | Maile | 452/41 |
| 7,521,077 B2 | * | 4/2009 | Azzar | 426/513 |
| 7,597,612 B2 | * | 10/2009 | Maile et al. | 452/30 |
| 7,682,226 B2 | * | 3/2010 | Maile et al. | 452/41 |
| 7,819,726 B2 | * | 10/2010 | Le Paih | 452/141 |
| 2007/0212994 A1 | | 9/2007 | Maile | |

FOREIGN PATENT DOCUMENTS

| | | |
|---|---|---|
| DE | 19914499 A1 | 10/2000 |
| EP | 0432388 B2 | 6/1991 |
| EP | 1040758 A1 | 10/2000 |
| EP | 1837524 B1 | 9/2007 |

OTHER PUBLICATIONS

European search report for 11166888.5, dated Oct. 27, 2011.

* cited by examiner

*Primary Examiner* — Richard Price, Jr.
(74) *Attorney, Agent, or Firm* — Marshall, Gerstein & Borun LLP

(57) ABSTRACT

A conveyor system for a filling machine and a method of conveying pasty mass with a corresponding conveyor system and a corresponding filling machine, including a housing with a vacuum opening and a vacuum pump as well as a suction line for generating a vacuum in the conveyor system. A valve mechanism and at least one pressure sensor for measuring the pressure in the suction line and/or in the conveyor system are provided. A controller controls the vacuum in the conveyor system or the suction line, respectively, wherein the cross-section of the suction line is adjusted in response to the measured pressure via the valve mechanism.

21 Claims, 6 Drawing Sheets

VACUUM CONTROL IN A VACUUM FILLER WITHOUT EXTERNAL AIR SUPPLY

CROSS-REFERENCE TO RELATED APPLICATION

The present application claims the benefit of priority of European Application No. 11166888.5, filed May 20, 2011. The entire text of the priority application is incorporated herein by reference in its entirety.

FIELD OF THE DISCLOSURE

The disclosure relates to a conveyor system, a method of conveying pasty mass and a filling machine.

BACKGROUND

Conveyor systems, in particular vane pumps, are already being employed for conveying sausage meat from hoppers into filling tubes by which sausage casings are filled with the sausage meat. Such vane pumps are already described, for example, in EP 0432388 B2 and EP 1040758 A1. Vane pumps consist of a pump housing and a rotor eccentrically arranged therein which can be caused to rotate. Radially movably mounted vanes are arranged in the rotor and form conveyor cells together with the wall of the pump housing, the bottom and the lid of the housing, and the outer surface of the rotor. The pump housing has a meat inlet and a meat outlet. The sausage meat can be pushed, for example, from the outlet into a filling tube.

When pasty masses are filled with a vacuum filler, a vacuum is generated in the conveyor system by means of a vacuum pump. This vacuum partially or quasi completely withdraws the gas/air content from the mass to be filled, which is normally desired. By this, the end product will be compact and non-porous.

However, there are also end products which are to keep their air content completely or partly. To achieve this, the degree of vacuum in the conveyor system is lowered. By this, no air or only a portion of the air content is withdrawn from the mass to be filled. The product keeps its initial consistency and is in this case not compacted in an undesired way. Examples of end products whose gas proportion should not or only partially be withdrawn, or which should not be compacted, are: precooked meat loaf, Bavarian veal sausage, caviar, all masses that should remain creamy as well as grainy products.

Up to now, the vacuum pump has been operated in nominal load operation. To reduce the degree of vacuum and adapt it to the end product, a certain amount of external air is supplied to the vacuum system with a manually or electrically operated valve. By this, the pressure difference between the vacuum system and the air proportion of the medium to be filled is reduced, so that the gas proportion in the medium to be filled is maintained completely or partially. The lower the applied vacuum is, the less grainy products are compacted.

Each positive-displacement pump, here the conveyor system of the vacuum filling machine, has an inlet side and a pressure side. Depending on the tightness of the pump, a more or less high vacuum is formed by the enlargement of the chambers of the conveyor system on the inlet side. Usually, the formation of a preferably constant vacuum is additionally supported on this side of the conveyor system by means of the vacuum pump, as described above. If now the degree of this generated vacuum, as illustrated above, is to be reduced, e.g. by the controlled supply of external air, the pressure on the inlet side of the conveyor system can be lower than the pressure in the vacuum system. Thereby, external air or fresh air supplied from outside is sucked from the vacuum system into the conveyor system.

In the process, the following problems have arisen. The filling medium can be contaminated by bacteria. The filling of the conveyor system chambers is not uniform, inevitably leading to increased weight fluctuations of the ejected portions. The vacuum pump must suck off an unnecessarily high amount of air, resulting in technical problems in some vacuum pump types. The vacuum pump is operated at an unnecessarily high power and thus energy is wasted.

SUMMARY OF THE DISCLOSURE

Starting from this situation, one aspect underlying the present disclosure is to provide a conveyor system for a filling machine and a corresponding method which permit to produce end products with a low gas proportion in a reliable manner, where the end products are not contaminated and simultaneously high portion precision and a protection of the vacuum pump can be realized.

According to the present disclosure, a conveyor system for a filling machine for conveying pasty mass, in particular sausage meat, comprises a housing with a vacuum opening. Furthermore, the device comprises a vacuum pump which is connected with the interior of the conveyor system via a suction line to create a vacuum in the conveyor system. Suction line is defined as the region between the vacuum pump and (including) the vacuum opening in the housing of the conveyor system.

According to the disclosure, the filling machine comprises a valve means which is arranged in the suction line. Furthermore, at least one pressure sensor is provided for measuring the pressure in the suction line and/or in the conveyor system. A control means controls (closed loop control) the pressure in the conveyor system or the suction line, respectively, to a certain reference value, the cross-section of the suction line being adjusted depending on the pressure measured by the pressure sensor via the valve means. The pressure in the suction region in the conveyor system here essentially corresponds to the pressure in the suction line. Advantageously, by the control of the pressure without supplying external air, the degree of the vacuum on the inlet side of the conveyor system can at no time fall below the pressure in the suction line. This ensures that no external air can flow into the conveyor system. The pressure can be adjusted to a precise and constant value and thus leads to a constant product quality with a constant air proportion. The present disclosure also causes a more uniform filling of the conveying system and thus more constant portion weights at the outlet of the filling machine. The filling medium is not contaminated with external air. The vacuum pump never has to suck off more gas than can be withdrawn from the mass to be filled. This leads to a longer life of the vacuum pump. Thus, energy can be saved.

In a particularly advantageous manner, the conveyor system is a vane pump with a rotatably mounted rotor comprising radially movably mounted vanes which form conveyor cells with the walls of the housing. The vane pump comprises a suction region, a pressure region and a sealing region, where the vacuum opening in the suction region can be arranged in particular at the beginning of the suction region or in the sealing region.

It is particularly advantageous to arrange the pressure sensor in a region between the valve means and the vacuum opening. In this solution, the pressure sensor can be simply integrated in the suction line or in a branch line of the suction line in a simple and inexpensive manner without any structural measures being required at the conveyor system. The pressure sensor can thus also be retrofitted in already existing conveyor systems.

It is also possible to arrange the pressure sensor in the suction region of the conveyor system, in particular the vane pump. While the attachment of the pressure sensor within the conveyor system is somewhat more elaborate, the pressure in the suction region can be determined very precisely.

Advantageously, the valve means comprises a controlled proportional valve, i.e. a control valve, whose opening can be adjusted proportionally to the measured pressure.

Particularly advantageously, an on-off valve is arranged in parallel to the proportional valve between the vacuum pump and the vacuum opening. Thus, major control deviations can be quickly compensated, in particular at the beginning of the control. On the other hand, by this, a preferably small control valve with a small control range can be selected, involving on the one hand higher control accuracy and on the other hand lower costs and efforts.

Advantageously, a water separator is arranged in the suction line, in particular between the proportional valve and the vacuum opening. This brings about the advantage that moisture and mass to be conveyed cannot get into the valve means in the suction line or the vacuum pump, respectively, which could lead to damages in the long run.

So, according to the method according to the disclosure, the pressure in the suction line and/or in the conveyor system is measured, and the pressure is controlled by adjusting the valve opening in response to the measured pressure. Preferably, the control means here performs a proportional control, wherein the opening of the valve is adjusted proportionally to the measured pressure. To achieve a predetermined degree of evacuation or a desired amount of air in the pasty mass, a corresponding reference value or reference value range for the pressure in the conveyor system and/or the suction line is determined e.g. by trial and stored in the control means. This reference value or reference value range is then used for the control.

If the measured pressure exceeds a limiting value, i.e. in case of an excessive control deviation, an on-off valve connected in parallel to the proportional valve can be additionally opened. Thus, control deviations can be quickly compensated. Here, either a certain limiting value for the control deviation can be determined, or the on-off valve is additionally opened for a predetermined period at the beginning of the control.

Advantageously, the vacuum pump can be operated at an essentially constant nominal load, the pressure being adjusted in the conveyor system via the valve means.

Advantageously, the control means can be integrated in the machine control of the filling machine.

BRIEF DESCRIPTION OF THE DRAWINGS

The disclosure will be illustrated below with reference to the following figures.

DETAILED DESCRIPTION OF THE PREFERRED EMBODIMENT

Figure 1:
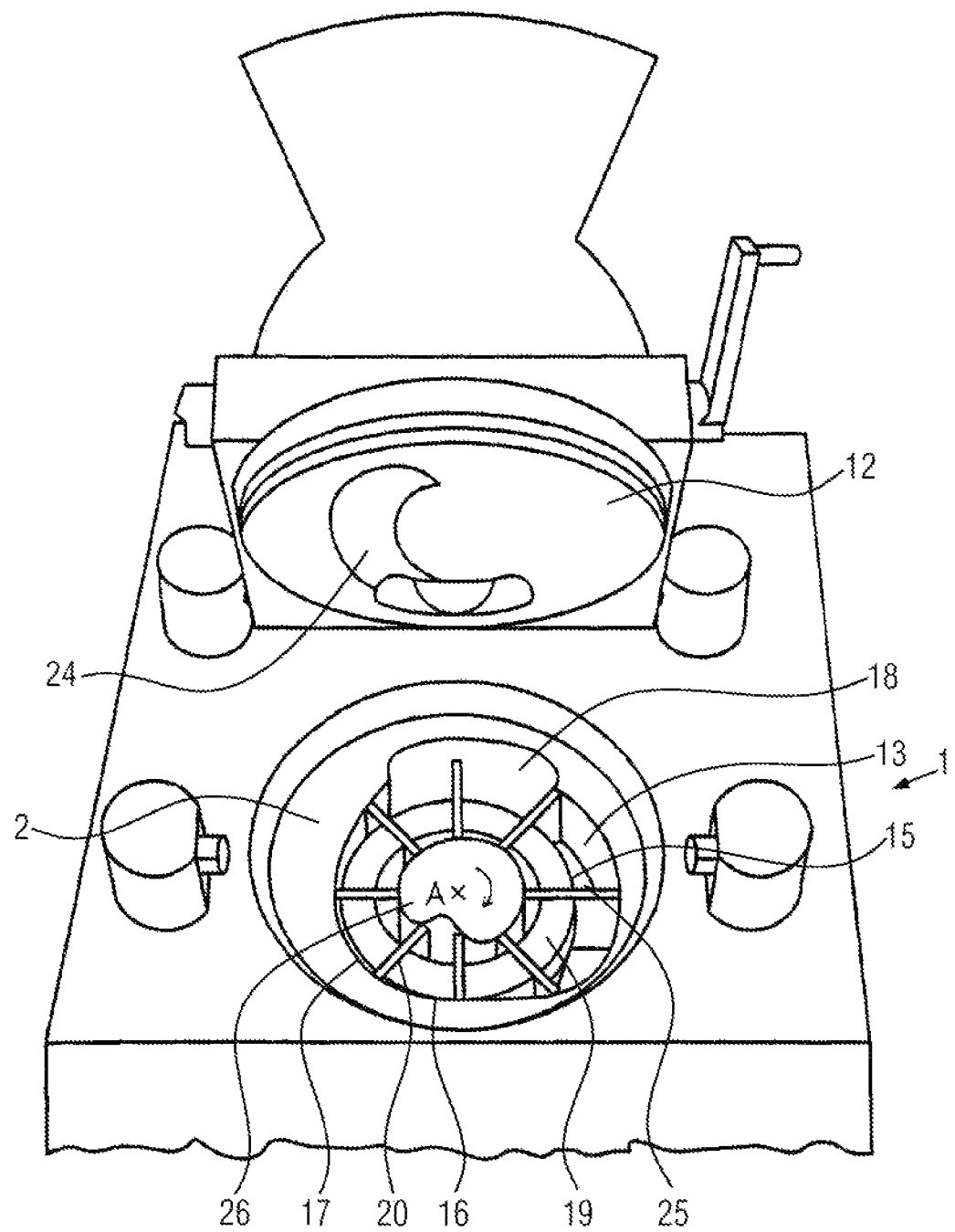
FIG. 1 shows an embodiment of a conveyor system according to the present disclosure in a perspective view.
Figure 2:
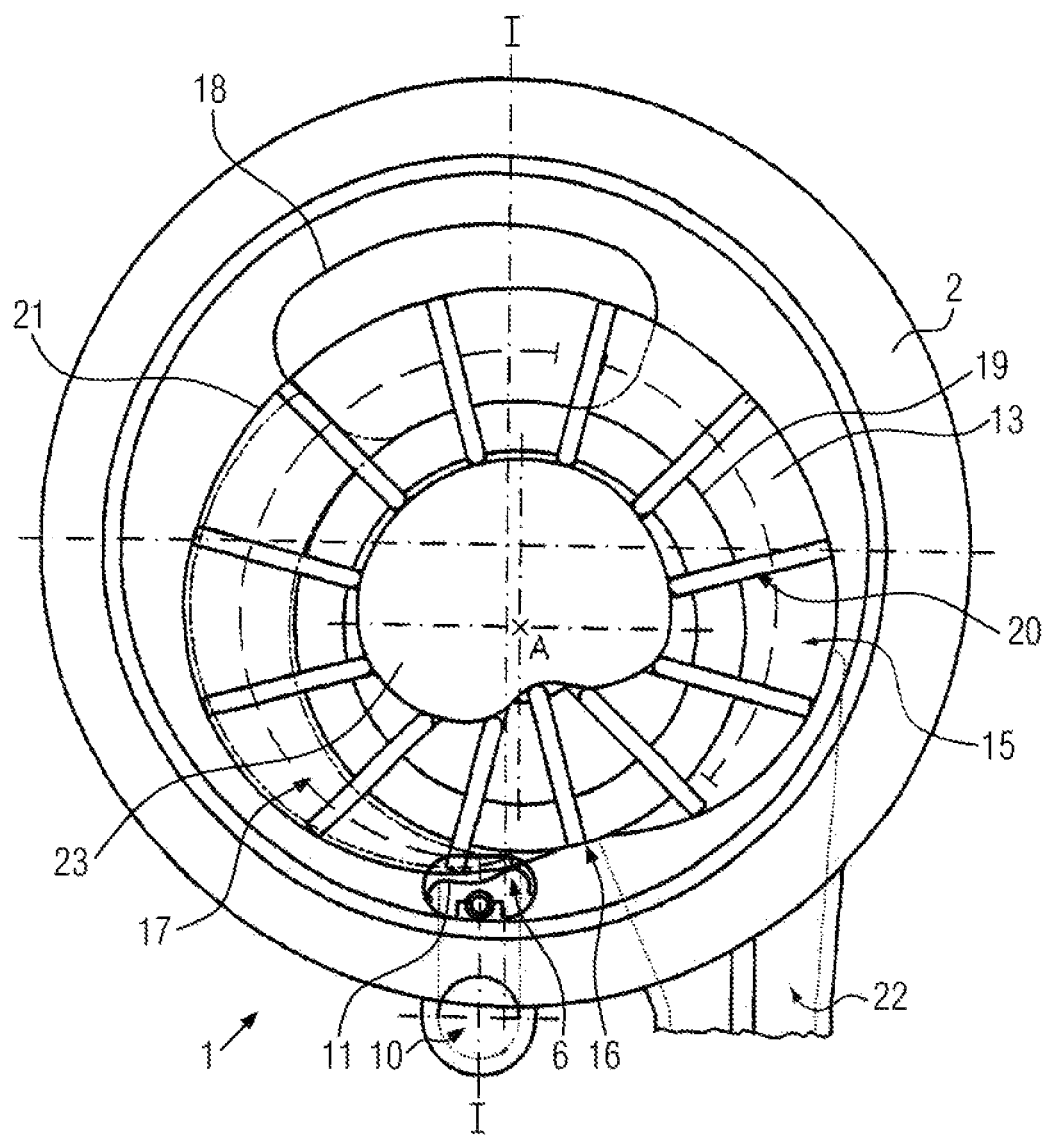
FIG. 2 shows a plan view of the conveyor system shown in FIG. 1 with the lid being removed.

FIG. 1 shows the design of a vane pump 1 according to the present disclosure in a perspective representation, and FIG. 2 shows a plan view. Preferably, the filling machine is a machine with an open hopper or a hopper in which no vacuum is created. As can be taken from FIGS. 1 and 2, the vane pump 1 for conveying pasty masses, in particular sausage meat, comprises a housing 2 and an inlet 18 for the pasty mass and an outlet 22 (see FIG. 2) for the portioned mass. The inlet 18 is connected, for example, with the outlet of a hopper 101 (see FIG. 6) via which the pasty mass is supplied to the vane pump 1. The outlet 22 is connected, for example, with a filling tube 102 (see FIG. 6). Via the filling tube 102, the portioned pasty mass is then shifted in a known manner into the sausage casing which is tightened up over the filling tube, or it is covered with a coextruded sausage casing. In the pump housing 2, the vane pump 1 comprises a preferably eccentrically arranged rotor 19 that can be caused to rotate and is driven about the axis A via a pump shaft. The central axis A is eccentrically arranged in the housing 2.

The rotor 19 comprises radially movably mounted vanes 20 which form conveyor cells 13 together with the walls 21 of the pump housing 2, the bottom 25 of the housing 2 and the side plate or the lid 12 of the pump housing 2. The rotor 19 is eccentrically mounted about a stationary clamping eccentric 26. By rotating the rotor or the vanes 20, respectively, pasty mass can be fed from the inlet 18 to the outlet 22 in the conveyor cells 13 in a known manner.

The vane pump can be generally subdivided into several regions. One of these regions is the suction region 17, another one is the pressure region 15, a sealing region 16 separating the pressure region 15 from the suction region 17. The pressure region 15 starts, in the sense of rotation, downstream of the inlet 18 and extends down to the outlet 22. The sealing region 16, which separates the pressure region from the suction region, follows downstream of the pressure region 15 which ends, in the sense of rotation of the rotor 19, downstream of the outlet 22. The suction region 17 is arranged downstream of the sealing region 16, which e.g. starts at a location where the gap-like distance between the rotor 19 and the inner wall 21 of the housing 2 is getting wider, such that the conveyor cells 13 enlarge again. The suction region 17 extends down to the end of the inlet 18. In the suction region, pressures of 0.005 to 1 bar prevail. As is shown in FIG. 1, the lid or the side plate 12 can comprise, on the side facing the interior of the conveyor system, a deepened groove surface or recess 24, respectively, in the upper region of the suction region. When the lid is closed, the groove surface 24 covers the vane cells 13 in the suction region 17 while it forms a gap between the bottom side of the lid and the upper side of the vane whose size essentially corresponds to the depth of the groove. While the vane cells 13 located between the sausage meat inlet 18 and the sausage meat outlet 22 are essentially sealed, through the gap 24, a connection is formed between the individual vane cells 13 to generate a vacuum.

As an alternative, this groove 24 in the suction region can also be arranged in the bottom 25 or in the housing wall 21.

Figure 3:
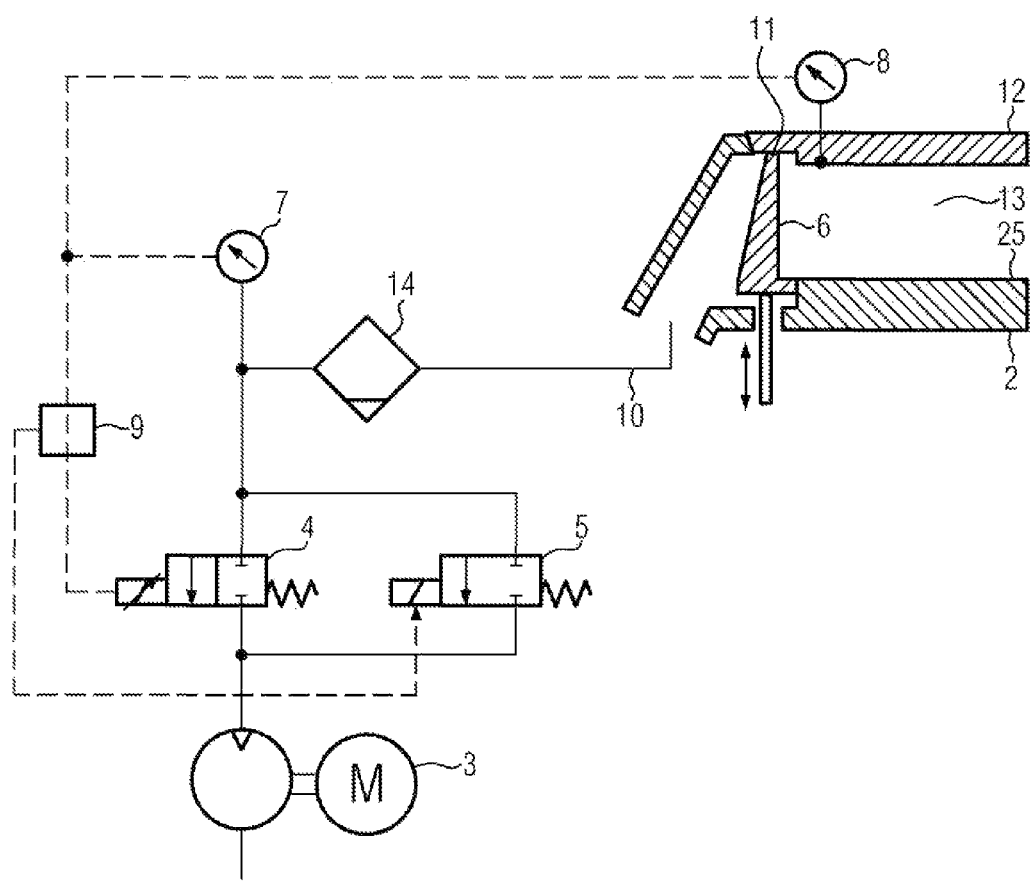
FIG. 3 schematically shows a first embodiment of a conveyor system with a controlled proportional valve in the suction line.
Figure 4:
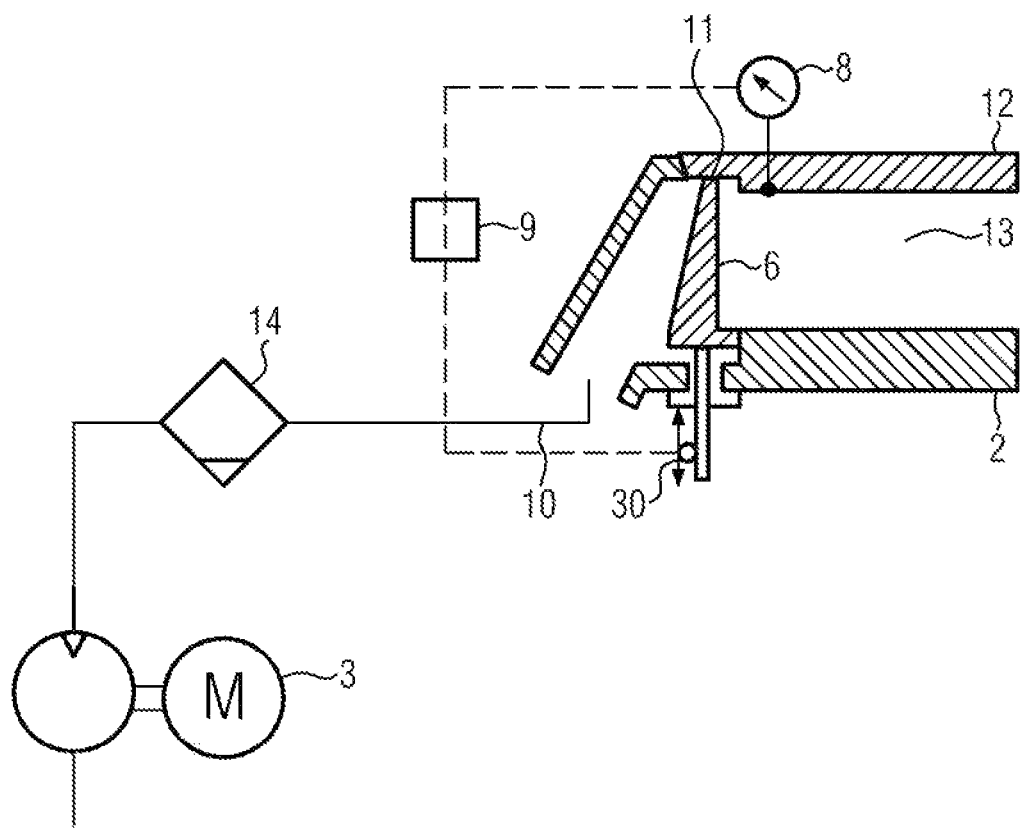
FIG. 4 roughly schematically shows a second embodiment of a conveyor system with a controlled vacuum slider.

As can be seen in particular in FIGS. 3 and 4, the housing 2 comprises for this, at the beginning of the suction region 17 laterally in the housing wall, a vacuum opening 11 which opens into the interior of a vane cell 13 and is connected with a vacuum pump 3 via a suction line 10. FIGS. 4 and 3 are roughly schematic representations of a section of the conveyor system and essentially correspond to a partial section along line I-I in FIG. 2. For the sake of simplicity, here only the beginning of the suction line 10 was drawn in detail in the form of the vacuum opening 11, the further suction line 10 only being represented as a line.

Suction line here means the region between the vacuum pump 3 up to and including the vacuum opening 11. By generating a vacuum in the vane cells 13 in the suction region, the sucking in of the sausage meat from the interior of the hopper into the vane cells at the inlet 18 is supported. Furthermore, a certain amount of air can be withdrawn from the product. In the embodiment shown in FIG. 3, the vacuum opening 11 can be closed completely and opened at least partially by means of a vacuum slider 6, as is illustrated by the arrow in FIG. 3. In FIG. 3, the vacuum slider 6 is in an upper closed position. The vacuum opening has e.g. a square cross-section. The slider 6 is e.g. arranged in or at the housing 2 such that its surface facing the interior of the conveyor system preferably extends essentially flush with the lateral inner housing wall 21, such that the vanes 20 can slide past the slider.

According to the first embodiment of the present disclosure shown in FIG. 3, here the valve means comprises a controlled proportional valve 4 between the vacuum pump 3 and the vacuum opening 11. Furthermore, a water separator 14 is arranged in the suction line 10 to separate off moisture of the pumped-off air and pasty mass. The embodiment furthermore comprises a pressure sensor 7 which measures the pressure in the suction line 10. The pressure sensor 7 can here be either arranged directly in the suction line 10 or else, as is represented in FIG. 3, in a branch line. In addition, this embodiment comprises a control means 9. The measuring signals of the vacuum sensor 7 are forwarded to the control means 9. The control means 9 controls the pressure in the suction line 10 or the corresponding pressure in the conveyor system chambers 13 in the suction region. The correcting element of this control is the proportional valve 4 whose opening is adjusted proportionally to the measured pressure. Thus, the cross-section and thus the passage in the suction line to the conveyor system are adjusted via the valve. If now, for example, a product is produced in which only a portion of air or no air proportion at all is to be withdrawn, the pressure in the suction region of the conveyor system, i.e. in the conveyor cells 13, can be controlled via the proportional valve 4.

In addition to the proportional valve 4, an on-off valve 5 can be connected in parallel. The on-off valve 5 can be opened or closed via a two-position control. By this, major control deviations can be quickly compensated. This is advantageous in particular at the beginning of the control. If the control deviation is reduced, the on-off valve 5 is closed again.

In addition or as an alternative to the pressure sensor 7, a pressure sensor 8 can be provided which measures the pressure in the conveyor system in the suction region. The measured values of the pressure sensor 8 are also forwarded to the control means 9, where then a control signal is generated in response to the measuring signal of the pressure sensor 8 and/or 7 to activate the valve means 4, 5. The control means 9 carries out a variance comparison and generates a corresponding control signal for the valves 4, 5. Normally, a pressure sensor is sufficient. If two pressures are measured, the mean value can be taken, for example, as actual value. However, it is also possible to use two control loops, wherein the two measured pressure values are each compared with corresponding reference values.

Figure 6:
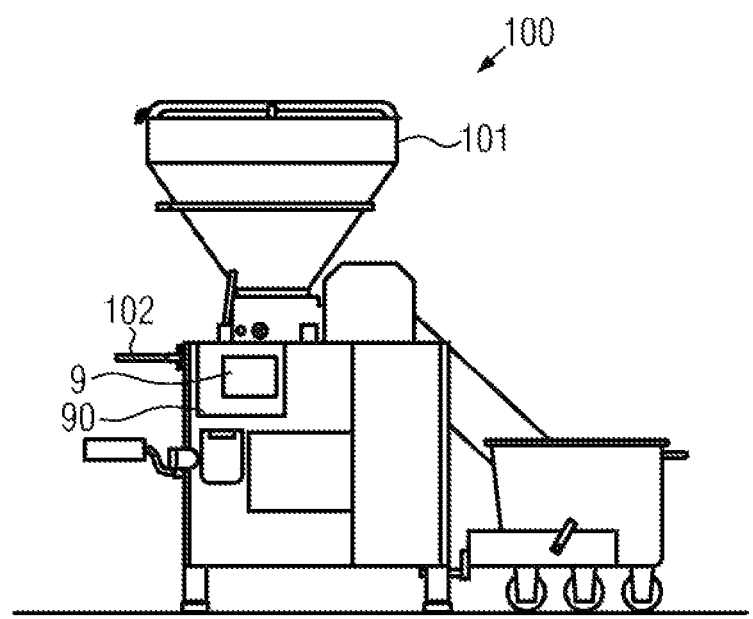
FIG. 6 schematically shows a filling machine according to the present disclosure.

The control means 9 can be either designed separately, but it can also be integrated in the machine control 90 (FIG. 6).

FIG. 4 shows a further embodiment in which the valve means comprises the vacuum slider 6. So here, the vacuum slider is not only used for opening and closing, but for adjusting the cross-section of the suction line. In this embodiment, the pressure sensor 8 is arranged such that it measures the pressure in the conveyor system 1, here within the conveyor cell 13, in the suction region. The measured values of the pressure sensor 8 are forwarded to the control means 9 which sends, on the basis of a variance comparison, a control signal to the correcting element, here the vacuum slider 6, the vacuum slider being moved upwards and downwards in the direction of arrow, for example via a servomotor 30, such that the cross-section of the suction line 10 changes in response to the measured pressure. Otherwise, the embodiment shown in FIG. 4 essentially corresponds to the embodiment shown in FIG. 3.

Figure 5:
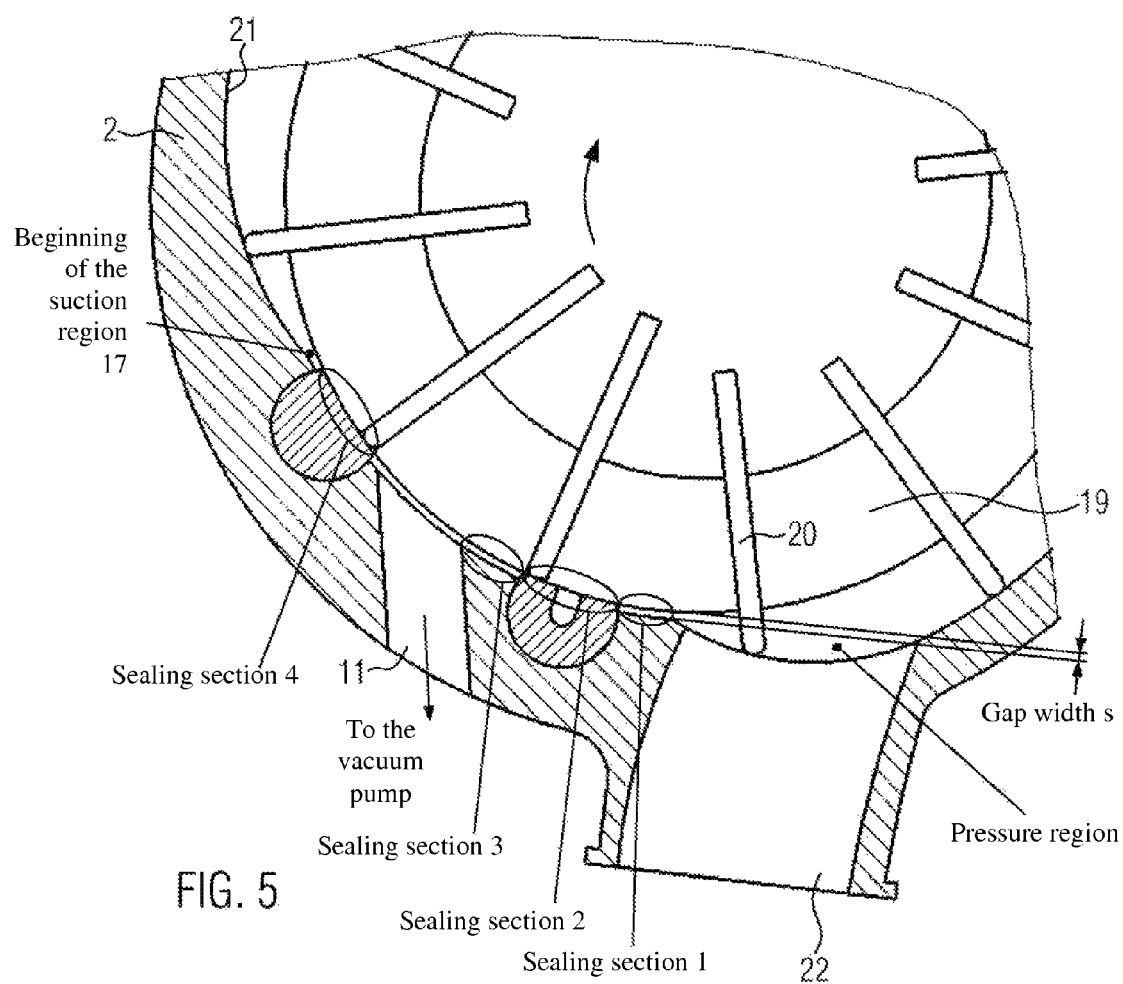
FIG. 5 roughly schematically shows a cross-section of a further possible embodiment in which the vacuum opening is arranged in the sealing region.

FIG. 5 shows another possible embodiment that corresponds to the previous embodiments in which the vacuum opening is not arranged in the suction region but in the sealing region between two sealing elements for sealing a gap between the rotor and the walls of the pump housing. In this embodiment, e.g. the groove 24 reaches into the sealing region. The detailed design of a corresponding sealing region is illustrated more in detail e.g. in patent specification EP 1 837 524 B1.

Below, the method according to the disclosure will be illustrated more in detail.

First, a reference value or a reference value range for the pressure in the conveyor system 1, i.e. in the conveyor cells 13 in the suction region 17, and/or for the pressure in the suction line is determined and entered into the control means 9. A corresponding value can be determined, for example, by trial by adjusting, by means of the valve means 4, 5 or 6, different vacuums and then checking at which pressure or in which pressure range (measured in the conveyor system and/or in the suction line) the finished product has a desired consistency or a desired air proportion, respectively.

Via the hopper 101, pasty mass is fed to the conveyor system. For adjusting the predetermined vacuum within the conveyor system in the suction region 17, the vacuum slider 6 shown in FIG. 3 is moved to its open position, so that at least a portion of the vacuum opening 11 is exposed. Moreover, the vacuum pump 3 operates. The pressure in the suction line 10 is measured via the at least one pressure sensor, e.g. the pressure sensor 7. As an alternative or in addition, the pressure can be measured via the pressure sensor 8 in the conveyor system. The measured values are sent to the control means 9 which carries out a variance comparison and sends, based on this comparison, a control signal, which is proportional to the measured value, to the proportional valve 4 which is completely opened at the beginning of the control operation. It is furthermore checked in the control means whether the control deviation is large, i.e. whether the measured pressure exceeds a limiting value. If this is the case, the on-off valve 5 connected in parallel is opened in addition. If the measured pressure falls below this limiting value, the on-off valve 5 is closed again. The on-off valve is subject to a two-position control. As an alternative, however, it is also possible to additionally open the on-off valve 5 at the beginning of the control over a predetermined period.

In this manner, a predetermined constant pressure can be adjusted in the conveyor system 1.

As an alternative to the above-described method, the valve means can also be formed by a vacuum slider 6 (FIG. 4) whose position is then adjusted proportionally to the pressure measured via the pressure sensor 8, so that the passage in the suction line to the interior of the conveyor system is controlled.

The pressures within the suction region are within a range of 200 to 800 mbar with products from which only a small air proportion or hardly any air proportion is to be withdrawn. With products from which a large air proportion is to be withdrawn, the pressure in the conveyor cells 13 can be within a range of 5 to 200 mbar. The pressure in the hopper is preferably normal pressure or external pressure.

Thus, the conveyor system and the corresponding filling machine are suited for the manufacture of compact and non-porous end products as well as for the manufacture of products with a larger air proportion. Here, it is ensured that no external air can flow into the conveyor system. This prevents contamination with external air and moreover brings about high portion accuracy. Moreover, the vacuum pump is protected. The air proportion can be adjusted very exactly.

The invention claimed is:

1. A conveyor system for a filling machine for conveying pasty mass, comprising
    a housing with a vacuum opening, and comprising
    a vacuum pump and a suction line for generating a vacuum in the conveyor system,
    a valve means in the suction line,
    at least one pressure sensor for measuring the pressure one of in the suction line, in the conveyor system, and in a combination thereof, by
    a control means for controlling the vacuum in one of the conveyor system, the suction line, and a combination thereof, wherein the cross-section of the suction line can be adjusted in response to the pressure measured by the at least one pressure sensor via the valve means.

2. The conveyor system according to claim 1, wherein the conveyor system is a vane pump and comprises a rotatably mounted rotor with radially movable vanes which form conveyor cells together with the walls of the housing, wherein the vane pump comprises a suction region, a pressure region and a sealing region which separates the pressure region from the suction region, and wherein the vacuum opening is arranged in the suction region, or in the sealing region.

3. The conveyor system according to claim 1, wherein the at least one pressure sensor is arranged between the valve means and the vacuum opening.

4. The conveyor system according to claim 2, wherein the at least one pressure sensor is arranged in the conveyor system in the suction region.

5. The conveyor system according to claim 2, wherein the vacuum opening is arranged at the beginning of the suction region.

6. The conveyor system according to claim 1, wherein the valve means comprises a proportional valve.

7. The conveyor system according to claim 6, wherein an on-off valve is arranged in parallel to the proportional valve between the vacuum pump and the vacuum opening.

8. The conveyor system according to claim 6, wherein a water separator is arranged in the suction line.

9. The conveyor system according to claim 8, wherein the water separator arranged in the suction line is between the proportional value and the vacuum pump.

10. The conveyor system according to claim 1, wherein the valve means comprises a vacuum slider which is arranged in the suction line, and whose position can be adjusted proportionally to the measured pressure.

11. The conveyor system according to claim 10, wherein the vacuum slider is for closing the vacuum opening.

12. A method of conveying pasty mass with a conveyor system formed according to claim 1, comprising:
    measuring the pressure in one of the suction line, the conveyor system, and a combination thereof, and
    controlling the pressure by adjusting the valve opening in response to the measured pressure.

13. The method according to claim 12, wherein the control means carries out a proportional control, the opening of the valve being adjusted proportionally to the measured pressure.

14. The method according to claim 12, wherein a reference value or a reference value range for one of the pressure in the conveyor system the pressure in the suction line, and a combination thereof, is determined and stored in the control means.

15. The method according to claim 14, wherein the pressure in the conveyor system comprises the pressure in the suction region of the conveyor system.

16. The method according to claim 12, wherein, in case of a major control deviation, opening an on-off valve, connected in parallel, in addition to the proportional valve.

17. The method according to claim 16, wherein the major control deviation comprises where the measured pressure exceeds a limiting valve.

18. The method according to claim 12, wherein the vacuum pump is operated at a constant power.

19. A filling machine for filling sausage casing with pasty mass, wherein the filling machine comprises a conveyor system formed according to claim 1.

20. A filling machine according to claim 19, wherein the control means is integrated in a machine control of the filling machine.

21. The conveyor system according to claim 1, wherein the pasty mass is sausage meat.

* * * * *